United States Patent [19]

Sullivan

[11] 3,809,820

[45] May 7, 1974

[54] MULTI-CHANNEL ASYNCHRONOUS TO SYNCHRONOUS CONVERTER

[75] Inventor: Dean R. Sullivan, Lakeside, Calif.

[73] Assignee: The United States of America as represented by the Secretary of the Navy, Washington, D.C.

[22] Filed: Apr. 3, 1973

[21] Appl. No.: 347,515

[52] U.S. Cl..... 179/15 BA, 178/69.5 R, 179/15 BV, 179/15 A, 179/15 BS, 179/15 BY

[51] Int. Cl. .............................................. H04j 3/06

[58] Field of Search ....... 179/15 BA, 15 BS, 15 BV, 179/15 A, 15 BY; 178/69.5 R

[56] References Cited

UNITED STATES PATENTS 3,692,942 9/1972 Inose ............................ 179/15 BV 3,749,839 7/1973 Fornasiero....................... 179/15 BA

*Primary Examiner*—Ralph D. Blakeslee

*Attorney, Agent, or Firm*—R. S. Sciascia; G. J. Rubens; J. W. McLaren

[57] ABSTRACT

Multi-channel apparatus for error-free translation of asynchronous data channels into a serial data stream. Independent synchronizing circuitry at each channel performs bit timing recovery to allow incoming bits to be sampled and properly interpreted and also stores bits in a manner to absorb bit difference resulting from incoming data rate differences. Common synchronous timing circuitry provides control signals to transfer data synchronously out of a memory device, to prevent interference between asynchronous write and asynchronous read operations, and to multiplex the individual channel outputs in a serial data stream.

6 Claims, 7 Drawing Figures

MULTI-CHANNEL ASYNCHRONOUS TO SYNCHRONOUS CONVERTER

BACKGROUND OF THE INVENTION

Communication systems, and especially satellite link systems, often require that a number of asynchronous data sources be inputted to a common synchronous unit. For example, the output of a number of teletype units often has to be coupled to a synchronous unit at a common station. The prior art includes various synchronizing apparatus; however, none are capable of providing error-free operation as is required in complex military communication systems. One particular prior art apparatus is especially effective as a synchronizer for an exchange or relay station in a digital communication system. However, the output rate of the apparatus is adjusted to accommodate the average of input rate variations.

SUMMARY OF THE INVENTION

Multi-channel, elastic buffering apparatus are disclosed for error-free translation of asynchronous input data channels into a common, synchronous time-base for time-division multiplexing into a serial data stream. Each incoming asynchronous data stream is processed in a synchronizing circuit wherein bit timing recovery is performed to allow incoming bits to be sampled and properly interpreted. Each synchronizing circuit also provides bit storage to absorb the bit difference resulting from the rate differences existing among the incoming data streams to convert all input data streams to a common time and phase base. Timing circuitry provides control signals to allow data to be moved synchronously out of the synchronizing circuit memories and to prevent interference between synchronous write and synchronous read operations.

OBJECTS OF THE INVENTION

The primary object of the present invention is to provide multi-channel, elastic buffering apparatus for error-free translation of asynchronous data streams into a synchronous, serial data stream.

It is another object of the present invention to provide converter means for translating asynchronous data channels into a common time base for processing in parallel by receiving apparatus.

Other objects, advantages and novel features of the invention will become apparent from the following detailed description of the invention when considered in conjunction with the accompanying drawings.

DESCRIPTION OF THE PREFERRED EMBODIMENT

Figure 1:
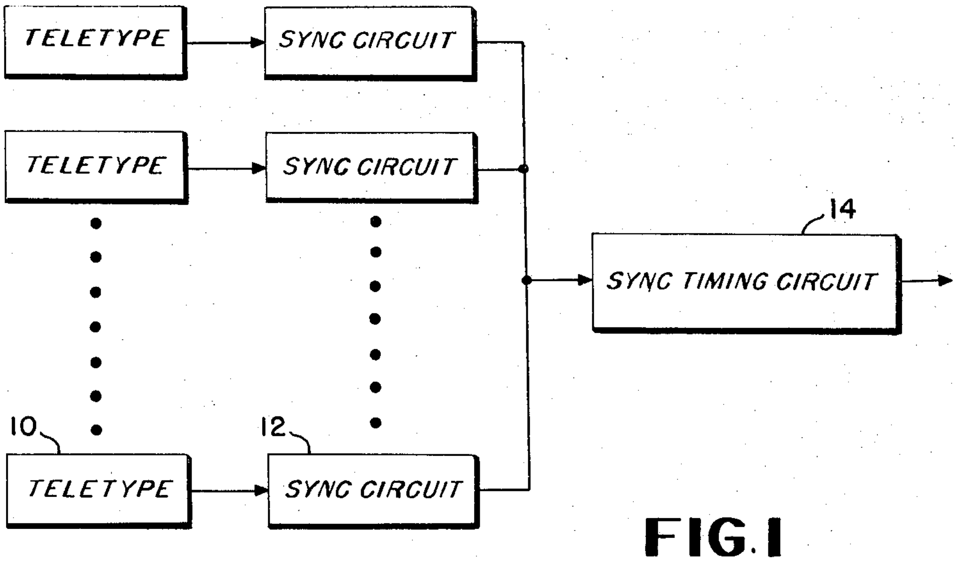
FIG. 1 is a simplified block diagram of an asynchronous-to-synchronous conversion system embodying the present inventive concept.

FIG. 1 illustrates in simplified form a system for converting asynchronous input data streams from a source such as a plurality of teletype units 10 into a synchronous, serial data stream. The data from each teletype channel is applied to a like synchronizing circuit 12 and the output from each of the circuits 12 are coupled to a synchronous timing circuit 14. The sync circuits 12 operate on the data streams to produce outputs having a common, synchronous time base in a unique manner and for a purpose to be described hereinafter.

To simplify the description which follows, only one sync circuit 12 will be utilized; however, it should be appreciated that the main advantage of the system resides in its multi-channel capability, and that the sync circuits are essentially identical.

In FIG. 1, a plurality of low data rate sources such as teletype units 10 provide asynchronous data streams, which in certain satellite link systems, need to be converted into a synchronous, serial data stream. Accordingly, each of the asynchronous streams is fed into a synchronizing circuit 12 wherein the streams are converted into a common, synchronous time base. The synchronized output are fed to the sync timing unit 14 which provides control signals to the sync circuits 12, and which performs time-multiplexing of the sync circuit outputs to produce a serial data stream.

Figure 2:
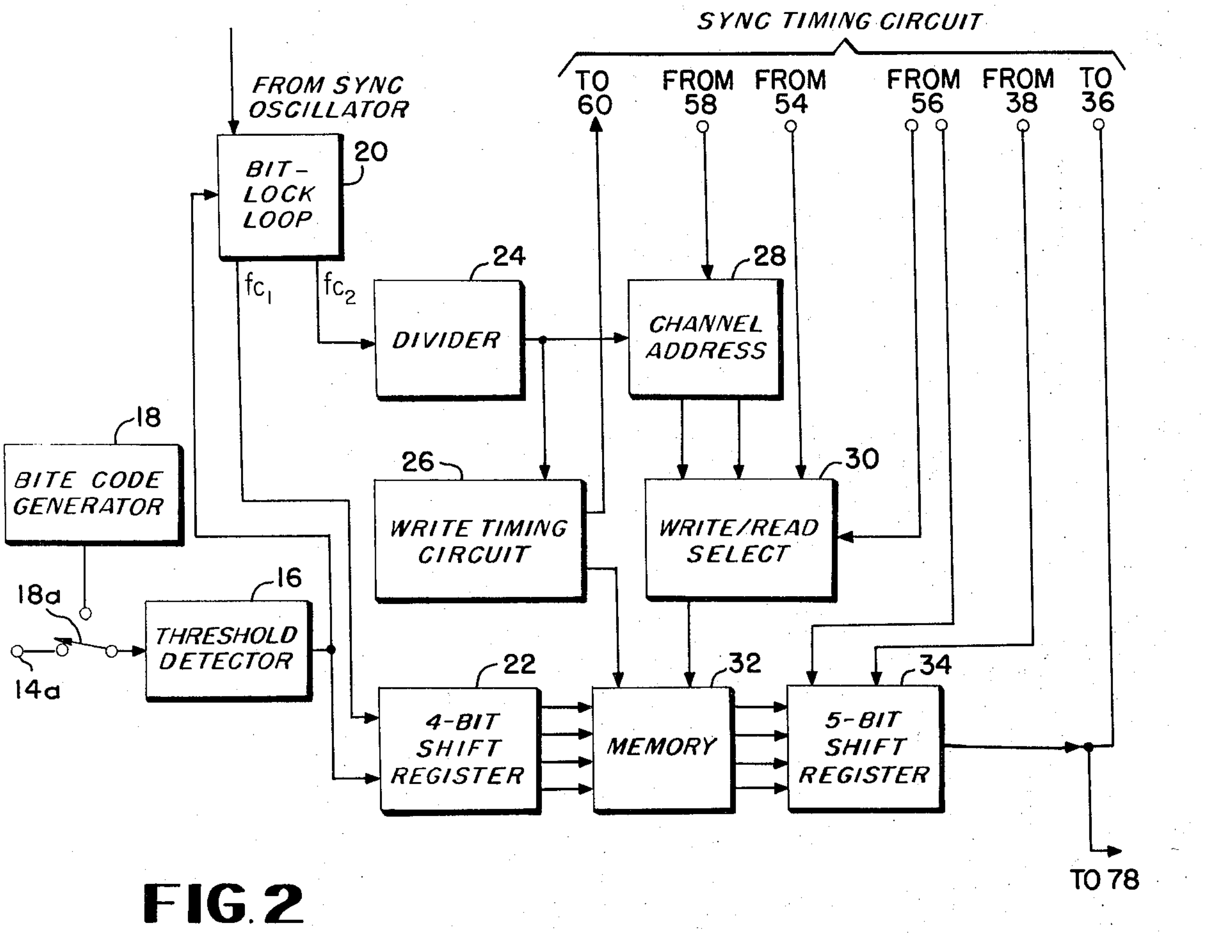
FIG. 2 is a schematic drawing of one of the synchronizing circuits of FIG. 1.

FIG. 2 is a schematic drawing of one of the sync circuits 12. Incoming data from a source such as a teletype 10 and at 75-baud, for example, is applied to the input terminal 14*a* of an input interface circuit or threshold detector 16 which detects ("1" or "0") from the incoming signal and converts the signal level to TTL logic levels. A manual switching apparatus 18*a* is connected between the input terminal 14*a* and the BITE code generator 18 for individual channel testing to be described hereinafter.

The threshold detector output is coupled in parallel to the bit-lock loop 20 for original data source timing recovery and to the shift register 22 for data entry into the memory 32. The bit-lock loop 20 phase locks onto the data stream within a selectively predetermined time period (e.g., twenty-seconds, worse case) and outputs a replica of the original data source timing. The oscillator source for the loop can comprise the internal synchronous oscillator 40 of FIG. 3, or a separate oscillator at essentially the same frequency.

The timing outputs, $f_{c_1}$ and $f_{c_2}$, of the loop 20 are in the form of short timing pulses (e.g., 0.5 $\mu$ secs) at various phases of the recovered clock, thereby providing unambiguous timing for the particular channel under consideration. The two pulses are 180° out of phase to allow data sampling at the center of the data.

The bit-lock loop comprises a simplified digital device which uses step phase correction in its operation. With a constant "mark" or "space" input, at which time there are no incoming transitions to reference to, the loop immediately cycles at the system synchronous rate $f_s/16$. In this state, the "mark" or "space" input is transferred as an output in normal fashion; however, the bit difference between input address and output address in memory is held constant thereby preserving memory storage capacity. Count-down apparatus in the loop allows for change of rate in binary steps with, for example, a single wire change.

Figure 5:
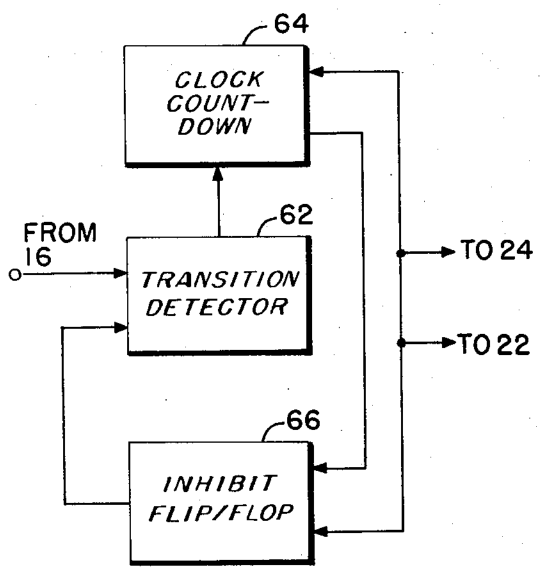
FIG. 5 is a simplified block diagram of the bit-lock loop of FIG. 2.

The bit-lock loop 20 is shown in more detail in FIG. 5. A negative transition detector 62 senses transition times of the incoming signal from the threshold detector 16 and resets the clock count-down circuit 64 thereby "pulling" it into phase sync with the incoming signals. The natural rate of the count-down is slightly lower than the original timing base of the incoming data stream by virtue of clock inhibiting action occurring with each received transition. Thus, phase correction typically amounts to a few microseconds advance in time. Further, since transition detections are only occasionally and randomly available from the data stream, the clock count-down will automatically reset itself if an external reset has not been received.

Obviously, double resetting of the count-down 64 would create an ambiguous condition, therefore it is necessary to inhibit more than a single reset each bit time period. An external reset from incoming data would normally precede a natural reset, however due to fortuitous distortion this is not always true.

The inhibiting flip-flop 66 is thus used to prevent double resetting, and it is cleared at the half point in bit timing to be ready at the next transition detection. The inhibiting flip-flop 66 only inhibits reset output; it does not affect "oscillator clock inhibit." The clock count-down circuit which is used as a time base in each incoming channel is forced by presence of incoming transitions to yield the rate slightly below the incoming rate. Since immediate external resetting is inhibited in ½-bit time following natural reset, phase alignment is then achieved by the step slipping action caused by each incoming transition.

At the value chosen, bit timing integrity can be maintained with paucity of transitions well below the average anticipated.

The incoming data is also serially clocked from the detector 16 at the 75-baud at the center of the incoming data bits into the four-bit shift register 22. Sampling and shifting of the data is arranged to avoid ambiguities present at the data transition times, and allows decisions to be made at the best possible position relative to switching times.

The other clock, $f_{c_x}$, from the loop 20 is counted down by four in the divider circuit 24 whose output commands the write timing circuit 26 to produce a guard pulse and a write pulse. The write pulse is of short duration and commands the memory 32 to accept four new bits of information in parallel from the shift register 22. The output of the divider 24 also advances the channel address unit 28.

The circuit 26 comprises two monostable multivibrators connected in parallel and being responsive to the pulse from 24 to produce the guard pulse and a selectively predetermined delay pulse. In series with the multivibrator which produces the delay is a third multivibrator which produces the write pulse in response to the delay pulse.

Figure 3:
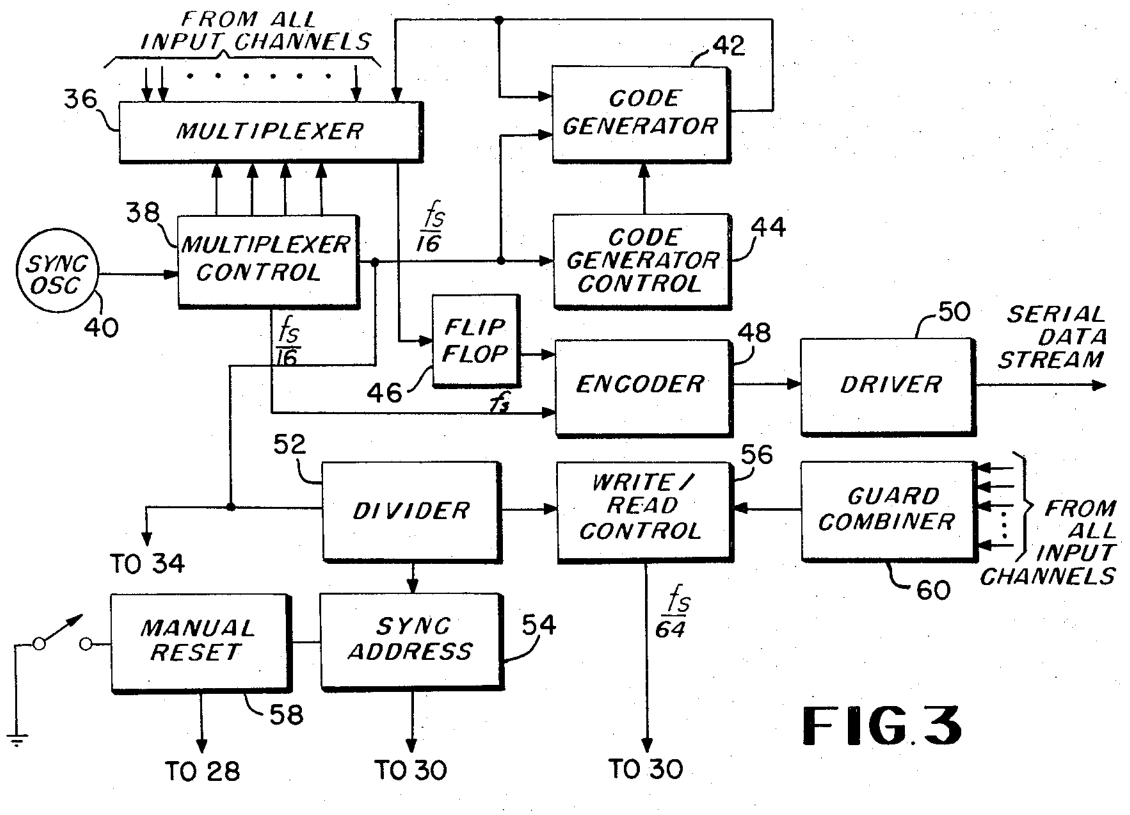
FIG. 3 is likewise a schematic drawing of the synchronizing timing circuit of FIG. 1.

The guard pulse, which encompasses the write pulse, is combined with the guard pulses from all other channels in a multi-channel, OR-gate combiner 60 of FIG. 3 to initiate action in the circuit 56 to ensure that the memory in each channel is being addressed by its respective channel address unit in a steady state condition. The guard pulse also initiates recycling of the write/read control unit 56 when the phasing is such that two events (e.g., write and read) are commanded simultaneously. The "write" command overrides the "read" command and allows the last four bits to be entered into the memory.

Thus, if the system is in the "read" mode, a guard pulse will override that command and allow immediate data entry into memory and will command the synchronous readout function to be reinitiated. A worse case combination of write and read conflicts cannot prevent proper entry or exiting of data. The apparent loss of synchronized timing by this recycling mechanism is recovered by relocking of the data from the synchronous time base, thereby removing any time uncertainty at the outputs.

Figure 4:
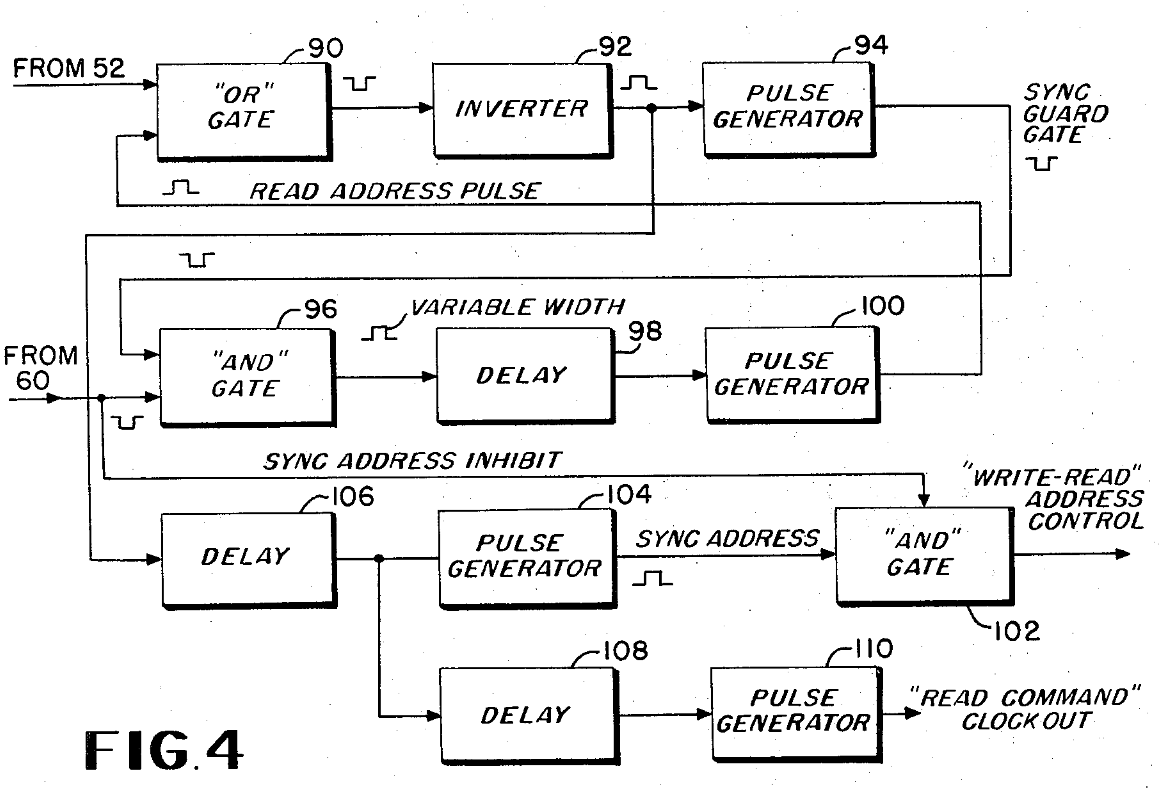
FIG. 4 is a schematic drawing of the write/read control circuit of FIG. 3.

The write/read control unit 56 is shown in detail in the schematic block diagram of FIG. 4. 75/4 baud input from the divider 52 is fed to the "OR" gate 90 which also receives a read address pulse from the pulse generator 100. The input is double inverted by the gate 90 and the inverter 92. The inverter 92 output triggers the pulse generator 94 which produces a sync guard gate similar to the channel guard gates. The output of 92 is also fed to the trigger delay circuit 106.

The delay circuit 106 provides a delay to the pulse generator 104 which produces a control pulse to allow selection of "synchronous address" in the channels and also allows the output shift register parallel entry from the memory 32. The sync address is outputted through the "And" gate 102.

The delay circuit 106 output also triggers the delay circuit 108 which in turn triggers the pulse generator 110. The "read" clock output commands readout from the memory 32, and the delays allow readout to occur only after the above sync address and shift register control have reached a steady state.

"OR" gate circuitry in the guard combiner 60 performs final combining of groups of guard gates from the plurality of channels. The presence of a guard gate from any channel (indicated requirement for that channel to "Write" in information into its memory) results in the output of 60 becoming negative. This negative signal is used to immediately inhibit the "And" gate 102 thereby resulting in the address and register control staying or reverting to channels address and preventing readout.

The negative pulse is also fed to the "And" gate 96 where it is "Anded" with the sync guard pulse from 94. The result is a variable width output from 96 which depends upon phase relationship between the two inputs. This output is delayed by delay 98 a sufficient amount to allow the channel to "Write" into memory. The delay 98 output then triggers the pulse generator 100 to produce a readdressing pulse. This readdressing pulse is entered into the "Or" gate 90 and acts in the same manner as the other input to generate a synchronous address and read cycle. This recycling process will be repeated as long as interferences occur between channel guard pulses (Write-in) or sync guard pulses (Readout).

The mechanism of FIG. 4 thus allows non-interfering writing in and readout of the memory, but insures that readout will occur in proper bit time even though readout action may have to be recycled many times.

The output of the divider circuit 24 is also used to update the asynchronous memory address counter 28 which provides a six-bit binary output to the write/read select unit 30 to select one of the addresses in the read and write memory 32. The memory 32 can comprise a conventional RAM device with, for example, 256-bits.

The memory address circuit 28 can comprise, for example, a six-bit, serial (sequential) counter which is reset to zero at the start of the communications day and which increments one-bit for each four-bits of the incoming data. The write or read select circuit 30 can comprise a six-pole, two-position electronic switch which allows the circuit 30 to accept the channel address 28 output or the synchronous address circuit 54 output.

In operation, four bits of data as selected by the synchronous address 54 command to the select circuit 30 are parallel shifted into the output shift register 34 upon command from the read signal from 56 at the $f_s/64$ rate, and then they are serially shifted out at the $f_s/16$ rate. The fifth bit of the shift register 34 is an independently clocked flip-flop, at a different phase of the $f_s/16$ rate, which is required to remove undesirable transitions created during parallel entry into the four-bit register; that is, all outputs temporarily change to "one" during parallel entry. The flip-flop also removes time differences due to recycling, and further provides a clean signal at the synchronous rate to the multiplexer 36 and to the bite monitor 78.

The serial output from each of the synchronous circuits 12 is coupled to the synchronous timing unit 14 of FIG. 1 and FIG. 3. The unit provides synchronous system timing signals to the circuit of FIG. 2 to allow data to be moved synchronously out of the plurality of memories and also provides control signals to prevent interference between asynchronous "write" and synchronous "read" operations. The unit further provides multiplexing, frame coding, differential encoding and output drive functions, as discussed below with reference to FIG. 3.

The synchronous timing unit comprises an internal, synchronous oscillator 40 or an external, frequency source (not shown). This oscillator or another equivalent unit is fed to all channel count-downs at original rate (i.e., $m \times f_s$). The oscillator output is counted-down and fed to a multiplexer control unit 38 which can comprise a four-bit counter to provide lines of, for example, 8–4–2–1, code to the multiplexer 36. The unit 38 also provides timing reference in the synchronous portion of the system.

The multiplexer 36 can comprise a sixteen-bit commutator which sequentially samples each of the input channels and produces a composite, serial data stream at $f_s$. In addition to the data streams received from the plurality of channels, the multiplexer 36 also receives a framing code from the code generator 42. The frame code allows the data stream to be decommutated at the receive end. The output of the multiplexer is reclocked in an output flip-flop 46 to provide a clean 1,200-baud signal to the differential encoder 48 whose output is coupled from the system by a driver 50.

The $f_s/16$ (75-baud) timing pulses from the multiplexer control unit 38 are provided in two phases to command transfer in the output shift register 34 in each channel. The $f_s/16$ signal is also counted-down by four in the divider 52 and fed to the write/read control unit 56. If no guard pulses are present, indicating no writing into memory is occurring, a write/read control pulse and a "read" pulse are immediately generated and fed to all of the channels to initiate transfer of data to the output registers 34.

If a guard pulse is present, action is prevented or terminated, as the case may be, and after a few microseconds, action is again initiated. The worst case condition in phasing of channels could require that the unit recycle fifteen times (for fifteen channels) before the "read" function is finally consummated. The timing arrangement utilized allows for the worst case condition.

After re-clocking the fifth stage in each channel, a clean data stream in time phase with the synchronous timing is present under any conditions. Thus the write/-read control signal bears a similar relation to the "read" signal that the "guard" signal bears to the "write" signal. This relationship insures that when either "write" or "read" action is initiated all logic levels have had sufficient time to establish themselves in a steady state condition to thereby remove any ambiguous decisions.

The manual reset circuit 58 comprises flip-flop and pulse-forming circuits with drivers and provides one group of two sequential timing pulses one in both phases to reset and set all counters as required. The synchronous address unit 54 is basically the same unit as the channel address 28; but it is reset to memory position one-half memory length away from channel addresses at the start of radio day. This allows both positive or negative bit slip rates to occur without error.

The framing code mechanism comprises a code generator 42 and a code generator control 44 and allows for code selection, code expansion by direct addition, introduction of a continuously changing reference, or independent operation as a PR maximal generator with addition of MOD–2 circuitry. The generator can comprise a circulating shift register which provides a fixed code of, for example, fifteen to seventeen-bits rigidly tied to the multiplexer timing.

Figure 6:
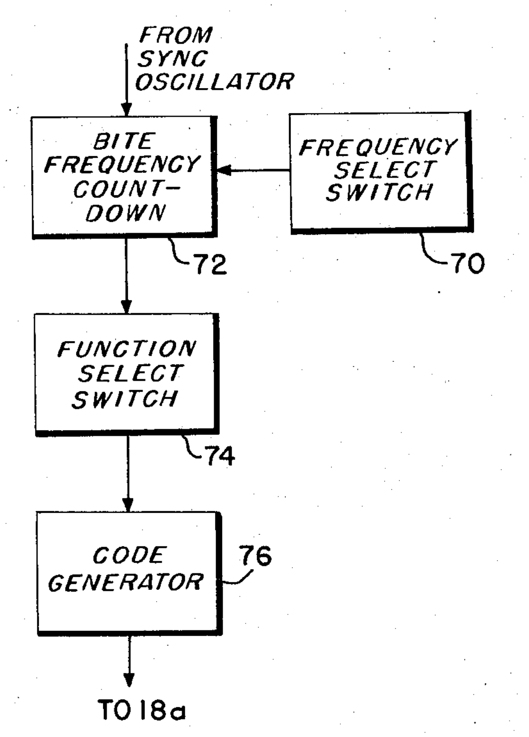
FIG. 6 is a simplified block diagram of the BITE code generator of FIG. 2.
Figure 7:
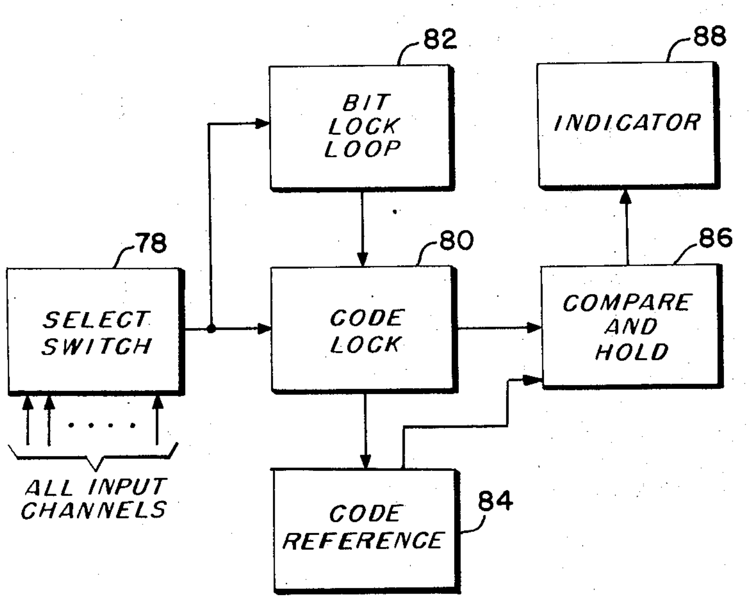
FIG. 7 is a simplified block diagram of the BITE monitor used with the BITE code generator.

Built-in test equipment (BITE) shown in FIGS. 6 and 7 is provided to accomplish individual channel checks. The clock source for the BITE code generator 18 can be a separate oscillator or an altered version of the internal sync oscillator 40. The clock ideally would provide the source at approximately two parts in $10^5$ above and below the sync frequency and at the sync frequency depending on degree of built-in checking desired. The high and the low values used to test channels under the worst case extremes and the synchronous rate used to allow the bite generator to be used as a source for "bounce-back" link checks.

The function select switch 74 could allow several checks to be performed. First, input data checks can be accomplished by using recovered timing from any selected input data channel to clock the bite-code generator 76. This permits the bite monitor to be used to determine whether or not the incoming channel is of adequate quality for acceptance by the system. This check can be performed without interfering with normal channel operation and does not require any decoding of information content.

Second, check of input channels can be performed to allow the BITE code to be inputted to a selected channel and the resultant output to be monitored. Go-no-go determination is performed automatically by the BITE monitor. A properly working channel should never make an error with the exception of memory overflow typically occurring every twenty-four hours worst case.

Finally, the unit provides self-check to allow the BITE-code generator 18 output to be fed directly to the BITE monitor to check out the entire BITE unit. The code generator 76 can be a 10-bit device with a fixed, start and stop bits and eight binary stepping bits in the random mode. The random mode is used for all automatic checking functions. The fixed code consists of fixed start and stop bits encompassing eight spaces or zeros. The fixed code is used to simplify manual signal trace of circuitry in the event that faults cannot be corrected by card replacement.

The BITE monitor input select switch 78 comprises a combination mechanical and IC selection network (desirably ganged) to the function switch 74 in the BITE code generator and to allow the selection of any channel.

The BITE monitor provides an independent bit-lock loop 82 for timing recovery. The loop must provide both fast and slow response times since the fast response is required for channel internal checking and the slow response is needed to allow bit tracking only slightly faster than the worst case of frequency drift possible on any channel to thereby provide error indication if incoming stream exceeds these limits.

The code-lock circuit 80 can comprise a 30-bit register used to decode or recognize a sequence of the BITE-code stream. When decode occurs, the reference generator 84 is preset, pulling it into step with incoming BITE code.

Decode could be allowed to turn off the indicator 88 unless the indicator is manually switched to hold error. In the hold condition, 88 can be reset by manual switch. The incoming bit stream and the reference generator are compared in the logic circuit 86 which is clocked at the center of the BITE timing. Any time a bit match does not occur, the circuit outputs a pulse which sets or turns on the indicator 88.

Obviously many modifications and variations of the present invention are possible in the light of the above teachings. It is therefore to be understood that within the scope of the appended claims the invention may be practiced otherwise than as specifically described.

What is claimed is:

1. Apparatus for converting asynchronous data streams from a plurality of data sources into synchronous data streams and comprising:

input means connected to the output of each of said data sources for receiving at each of said input means one of said asynchronous data streams, each of said input means comprising bit-lock loop means for recovering the original data source timing of the corresponding data stream and to provide two output timing signals at selectively predetermined phases of the recovered timing and being 180° out of phase with respect to each other, first shift register means connected to said data source and to one of said two timing signals of each loop means for sampling said data stream, write control means connected to the output of said loop means and being responsive to the other of said two timing signals to produce a guard pulse and a write pulse, said write pulse being encompassed within said guard pulse, memory means connected to the output of said first shift register means and said write control means for accepting the output from said first shift register in response to said write pulse, memory address means connected to the output of said loop means and connected at the output to said memory means for addressing said memory means;

second shift register means connected to the output of said memory means for receiving the output thereof in response to said read pulse;

synchronous timing means for generating synchronous timing signals and being connected at the output to each of said second shift register means in each of said input means whereby all of said second shift registers output a time-synchronized data stream, said timing means further including write/read control means connected to the output of each of said write control means and connected at the output to said memory address means and said second shift register means and being responsive to said guard pulses to provide control signals thereto to prevent interference between asynchronous storage and synchronous transfer operations.

2. The apparatus of claim 1 wherein said bit-lock loop means comprises:

clock means;

count-down means connected to the output of said clock means;

transition detector means for sensing transition times of said data streams and for producing reset pulses in response thereto and being connected at the output to said count-down means, said count-down means being responsive to said reset pulses to produce an output which is in phase synchronism with said data stream; and, inhibit means connected at the input to said count-down means and at the output to said detector means to inhibit more than one reset each bit time period.

3. The apparatus of claim 1 wherein said write control means comprises first and second monostable multivibrators connected in parallel and a third multivibrator connected in series to said second multivibrator.

4. The apparatus of claim 3 wherein said memory address means comprises a six-bit, serial counter connected at the output to a six-pole, two-position switch.

5. The apparatus of claim 1 further including common multiplexer means connected to the output of each of said second shift register means and being responsive to said time-synchronized data streams to produce a serial data stream.

6. Asynchronous to synchronous converter apparatus comprising:

multi-channel input means for receiving a plurality of asynchronous data streams;

first means connected to each channel of said input means for recovering the original bit timing of each of said data streams;

second means connected to the output of said first means for sampling said data stream;

memory means connected to said second means for storing the output thereof; and, third means connected to each of said memory means for transferring the output thereof in a time-synchronized manner with respect to each other.

* * * * *